United States Patent [19]

del Toro et al.

[11] E Re. 30,275

[45] Reissued May 20, 1980

[54] HEAT EXCHANGER

[75] Inventors: James J. del Toro, North Syracuse; Rudy C. Bussjager, Syracuse, both of N.Y.

[73] Assignee: Carrier Corporation, Syracuse, N.Y.

[21] Appl. No.: 1,323

[22] Filed: Jan. 5, 1979

Related U.S. Patent Documents

Reissue of:

[64] Patent No.: 4,057,976
Issued: Nov. 15, 1977
Appl. No.: 720,722
Filed: Sep. 7, 1976

[51] Int. Cl.[2] ..... F25B 1/00; F25B 13/00; F28F 27/02

[52] U.S. Cl. ..... 62/115; 62/160; 62/324; 165/97

[58] Field of Search ..... 62/324 R, 504, 115, 62/160; 165/97

[56] References Cited

U.S. PATENT DOCUMENTS

| | | | |
|---|---|---|---|
| 2,785,540 | 3/1957 | Biehn | 62/324 |
| 3,024,619 | 3/1962 | Gerteis et al. | 62/324 |
| 3,132,490 | 5/1964 | Schmidt | 62/324 |
| 3,142,970 | 8/1964 | Hale | 62/324 |
| 3,150,501 | 9/1964 | Moore | 62/324 |
| 3,358,470 | 12/1967 | Frediani | 62/324 |
| 3,977,210 | 8/1976 | Bruguier | 62/324 |

*Primary Examiner*—Lloyd L. King
*Attorney, Agent, or Firm*—J. Raymond Curtin; Robert P. Hayter

[57] ABSTRACT

A heat exchanger for use in a reversible refrigeration system. The exchanger is divided into a plurality of heat transfer zones containing one or more circuits. Control means are provided to route refrigerant through each zone in a series progression when the heat exchanger is serving as a condenser. The flow geometry is automatically changed when the function of the exchanger is reversed from condenser to evaporator so that refrigerant flows simultaneously through each of the heat transfer zones.

10 Claims, 6 Drawing Figures

HEAT EXCHANGER

Matter enclosed in heavy brackets [ ] appears in the original patent but forms no part of this reissue specification; matter printed in italics indicates the additions made by reissue.

BACKGROUND OF THE INVENTION

This invention relates to a heat exchanger for use in a reversible vapor compression system and, in particular, to a heat exchanger that is capable of effectively performing as either a condenser or an evaporator in a heat pump environment.

Generally, in the reversible refrigeration system a pair of heat exchangers, typically being an indoor heat exchanger and an outdoor heat exchanger, are selectively connected to a compressor by means of a four-way valve or the like. By selectively positioning the valve, the discharge from the compressor is routed to one or the other of the exchangers to deliver either heating or cooling to the indoor region. When cooling is to be provided, the outdoor exchanger is called upon to serve as a condenser in the system while the indoor coil must perform as an evaporator. Switching to a heating mode of operation reverses the roles of the two exchangers.

It is well known in the art that a heat exchanger that is specifically designed to function as a condenser does not under ordinary circumstances function as well when required to serve as an evaporator. As a consequence, heat exchangers normally employed in most heat pumps represent a compromise in design which places an adverse limitation on the overall performance of the system.

SUMMARY OF THE INVENTION

It is therefore an object of the invention to improve the operation of a heat pump.

It is a further object of the present invention to improve the performance of a heat exchanger utilized in a heat pump.

It is yet another object of the present invention to provide a single heat exchanger that is capable of effectively operating as a condenser and an evaporator in a heat pump system.

These and other objects of the present invention are attained by means of a heat exchanger that is divided into a plurality of heat transfer zones containing one or more circuits, control means for routing refrigerant through each zone in a series progression and means to automatically change the flow geometry through the exchanger when the mode of operation of the system is changed and the exchanger function is reversed from condenser to evaporator whereby refrigerant flows through each heat transfer zone simultaneously.

BRIEF DESCRIPTION OF THE DRAWINGS

For a better understanding of the present invention as well as other objects and further features thereof, reference is had to the following detailed description of the invention to be read in connection with the accompanying drawings, wherein.

DESCRIPTION OF THE PREFERRED EMBODIMENT

Figure 1:
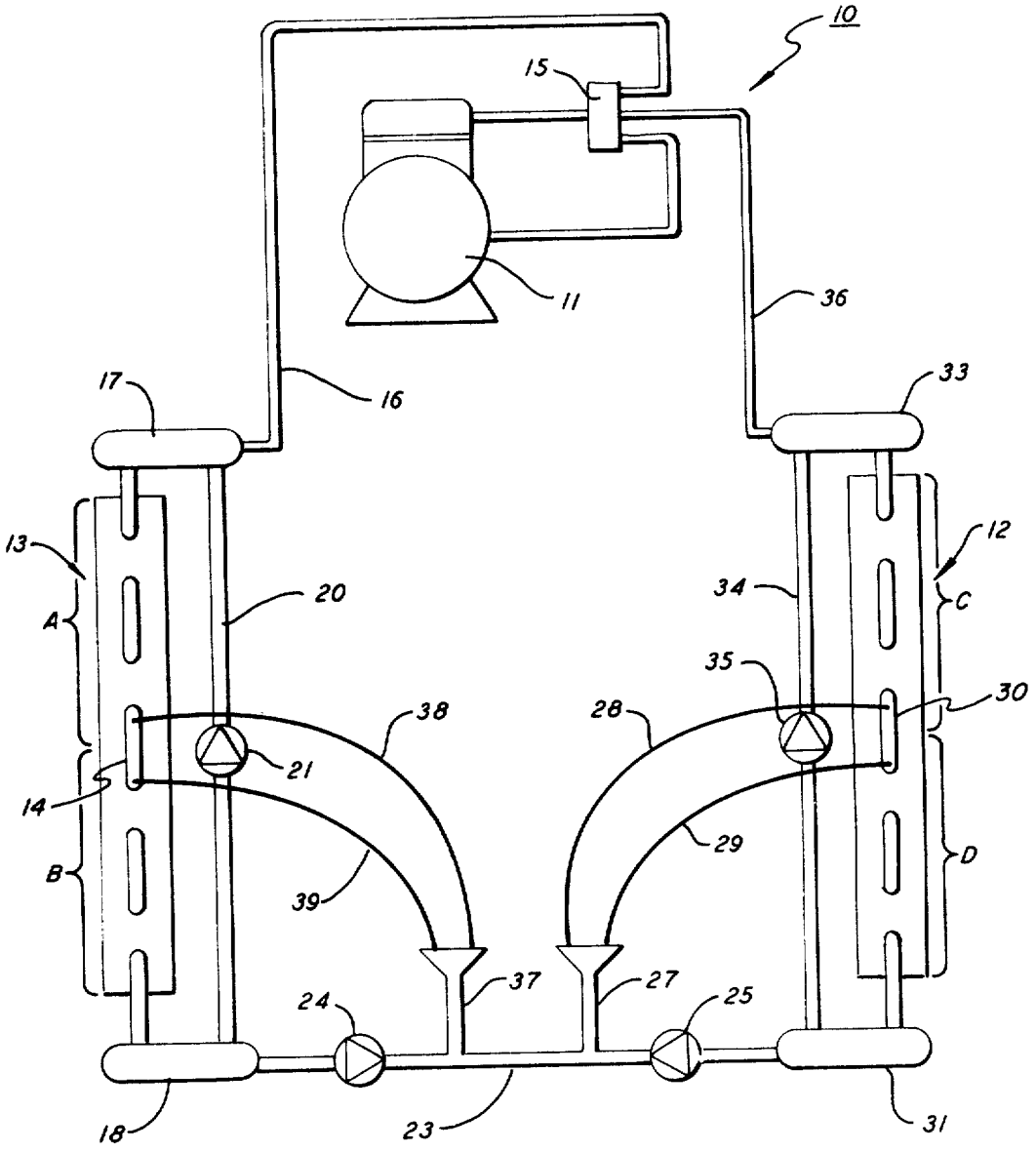
FIG. 1 is the schematic representation of a reversible refrigeration system utilizing the heat exchanger of the present invention.

FIG. 1 represents the simplest form of the invention being utilized in a reversible vapor compression system, generally referenced 10. The system includes a compressor 11 of any suitable design and two refrigerant heat exchangers 12, 13, which are typically plate fin coils which are specifically fabricated to exchange energy between air moving over the plates and refrigerant moving through the exchanger flow circuits. For purposes of this description, heat exchanger 12 shall be referred to as the indoor coil while heat exchanger 13 shall be referred to as the outdoor coil. The two coils are operatively connected to the compressor by a four-way valve 15, which enables the discharge vapor from the compressor to be selectively directed into either one of the exchangers. When the system is in a cooling mode of operation, the discharge is carried via line 16 into a primary header 17 associated with the outdoor coil. At this time, the suction end of the compressor is operatively connected to the primary header 33 by means of line 36. By cycling the four-way valve, the flow of refrigerant through the system is reversed and, accordingly, the role of the heat exchangers is also reversed.

The operation of the system shall be initially explained with the system in a cooling mode of operation wherein the outdoor coil 13 is called upon to serve as a condenser. The refrigerant vapor collected in the primary or upper header 17 flows downwardly through the outdoor coil 13. The refrigerant is caused to move through two heat transfer zones, an upper zone A and a lower zone B. The two zones are separated by return bend 14 which functions as an intermediate header for passing refrigerant from one zone to the other.

After passing through the two heat transfer zones, the refrigerant enters a lower secondary header 18 associated with the outdoor coil. The lower header 18 is placed in fluid flow communication with secondary header 31 associated with the indoor coil by means of liquid line 23. It should also be noted that the lower header 18 is also placed in fluid flow communication with the upper header 17 by line 20 which by-passes the heat exchanger circuit. A check valve 21 is positioned in the by-pass line. The valve is held closed when the outdoor coil is operating as a condenser by the pressure difference established over the exchanger as the refrigerant changes from a vapor to a liquid. As a result, the liquid refrigerant collected in the lower or secondary header is prevented from flowing back into the primary header via line 20 when the exchanger is serving as a condenser.

The liquid refrigerant collected in header 18 moves along liquid line 23 through another check valve 24.

Check valve 24 is arranged to open when the system is in a cooling mode of operation whereby the liquid refrigerant is directed toward the indoor coil 12. A second check valve 25 also is positioned in the liquid line close to the secondary header 31 associated with the indoor coil. The check valve 25 is arranged to operate in opposition with check valve 24 whereby the refrigerant is precluded from flowing directly from the liquid line into header 31. The refrigerant is thus forced to move into a distributor 27 positioned forward of check valve 25 in relation to the direction of flow.

In the distributor, the flow is split into two separate flow paths by means of a pair of capillary tubes 28, 29. As seen in FIG. 1, the capillary tubes are passed into centrally located return bend 30 which serves as an intermediate header in regard to the indoor coil. In practice the capillaries pass through the return bend and empty deeply into the circuit tubing connected thereto. As a result, a portion of the refrigerant is expanded into upper heat transfer zone C and a portion expanded into lower heat transfer zone D. Because of the pressures involved, a portion of the refrigerant flows upwardly through the indoor coil 12 into the primary header 33 and a portion of the refrigerant flows downwardly into the secondary header 31. As can be seen, the flow geometry of the indoor coil, which is functioning as an evaporator in the cooling mode of operation, consists of two distinct flow passages through which the refrigerant is moved simultaneously, one passage carrying refrigerant through heat transfer zone C and the other through heat transfer zone D.

As in the case of the outdoor exchanger, the indoor exchanger also has a by-pass line 34 associated therewith which places the primary header 33 in fluid flow communication with the secondary header 31. A check valve 35 is located in the by-pass line and is arranged to open when the exchanger 12 is operating as an evaporator. With check valve 35 open, the two headers 31, 33 are exposed to the suction side of the compressor by means of line 36 thereby completing the cycle.

Changing the system mode of operation, which is accomplished by cycling the four-way valve, reverses the flow of refrigerant through the system. This in turn changes the function of the two exchangers. At this time, the position of the four check valves changes. By-pass line 20 is thus opened while line 34 is closed. Similarly check valve 25 opens while check valve 34 closes.

The discharge from the compressor passes via line 36 and header 33 through the indoor coil, which is now acting as a condenser, into the lower header 31. The refrigerant, as it moves through the indoor coil, passes in series through the two heat transfer zones C and D. From the header 31, the refrigerant moves down the liquid line toward the outdoor coil. The flow is however blocked by closed check valve 24 causing the refrigerant to move into distributor 37 where the flow is split into two paths by means of capillary tubes 38, 39.

The capillaries pass through the intermediate header or tube bend 14 into the circuits associated with heat transfer zones A and B. Here again, the flow is split in two directions through the exchanger with part of the flow directed into secondary header 18 and part into primary header 17. The two headers are connected to the sunction end of the compressor via open by-pass line 20 and line 16 to close the heating loop.

As should be clear from the description above, the flow of refrigerant through the heat exchangers is automatically controlled so that the flow geometry through each exchanger is changed depending on whether the exchanger is being used as a condenser or an evaporator. More specifically, when the heat exchanger is called upon to serve as a condenser, refrigerant is caused to flow in series through the exchanger heat zones. By the same token, the refrigerant is caused to flow simultaneously, or in parallel, through the heat zones when the exchanger is serving as an evaporator. In this manner, the performance of the system can be optimized for either a heating or cooling mode of operation, a result heretofore unattainable because of limitations placed upon the system as a result of the compromise necessitated by heat exchanger design.

It should be clear from the description above that the system is not necessarily limited by the use of headers in connection with the exchangers when the invention is carried out in connection with a simple exchanger. In this regard the header can be replaced with standard tubing capable of facilitating the movement of refrigerant into and out of the exchangers.

Figure 2:
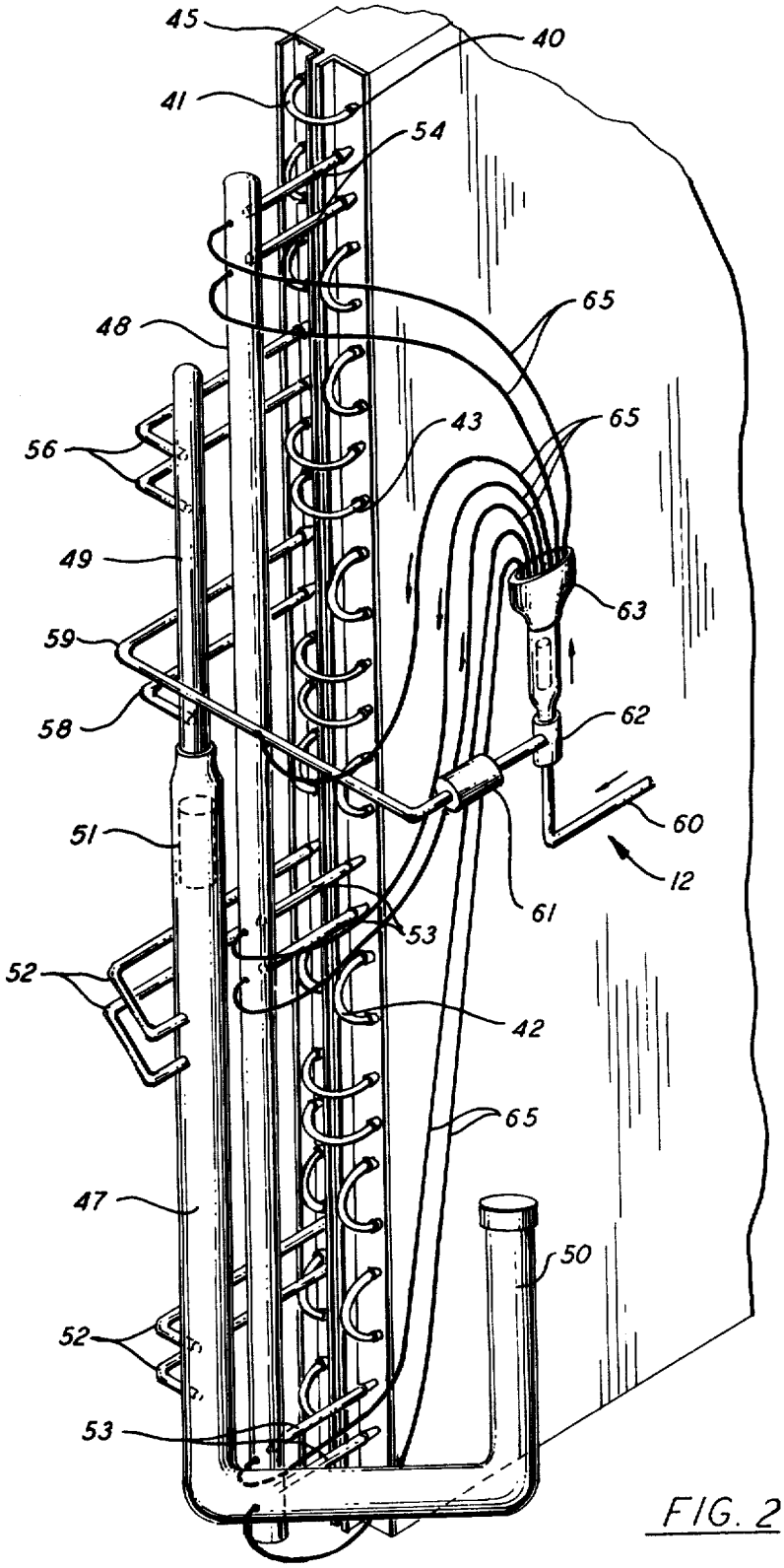
FIG. 2 is a partial perspective view showing a multi-circuit heat exchanger utilizing the teachings of the present invention.
Figure 3:
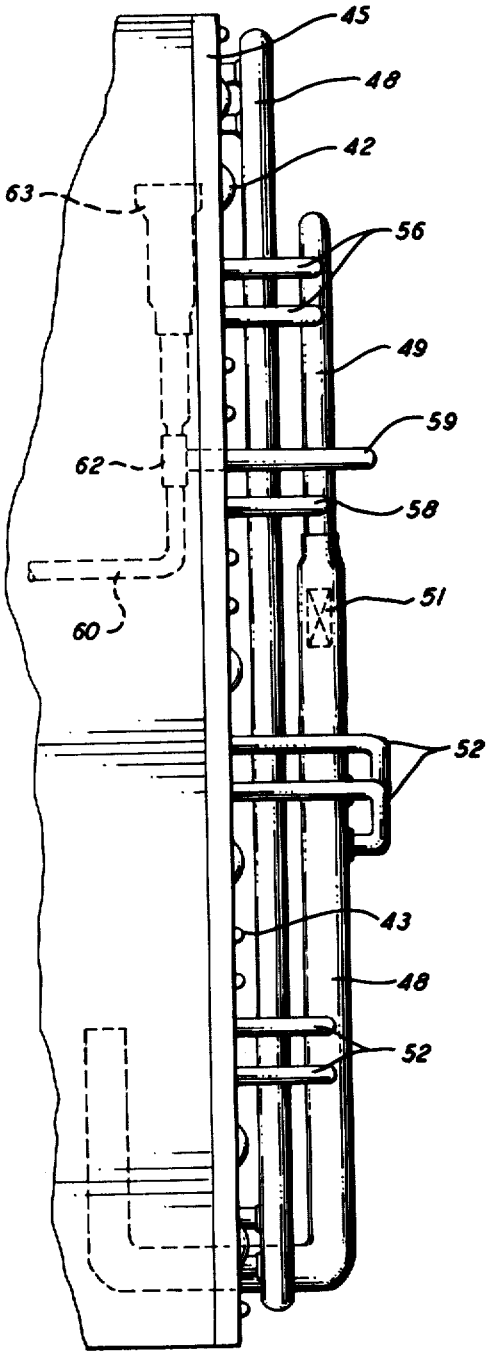
FIG. 3 is a partial front view of the heat exchanger shown in FIG. 2.
Figure 4:
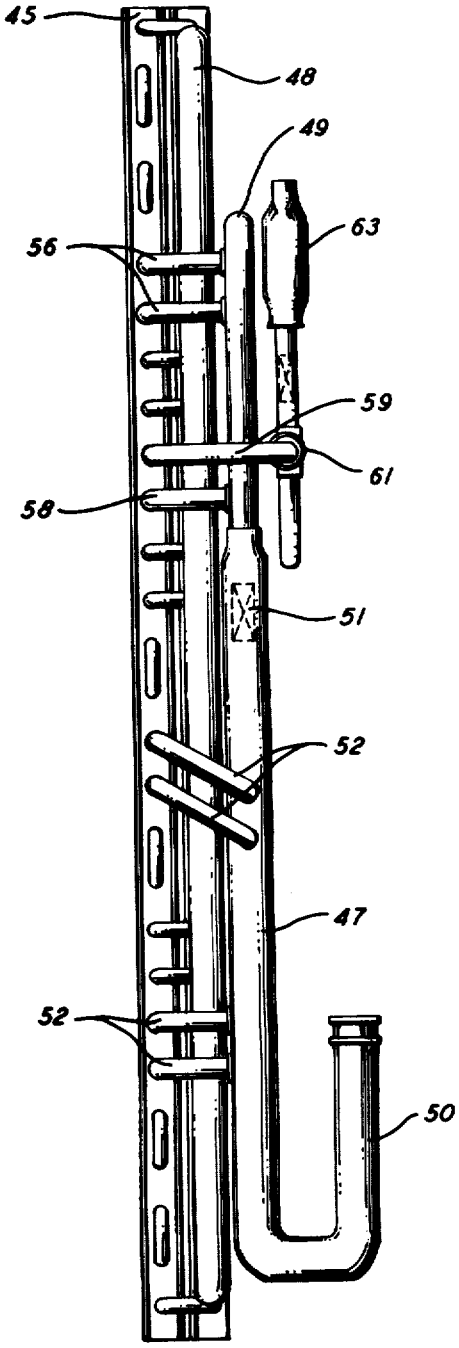
FIG. 4 is an end view of the heat exchanger shown in FIG. 3.

Similarly, the present invention can be carried out in conjunction with a complex coil in which a multitude of circuits are passed back and forth through the exchanger unit. A complex coil, such as those typically utilized in larger refrigeration systems is illustrated in FIGS. 2 through 4. For purposes of explanation, the coil shall be deemed to be an outdoor coil utilized in a reversible refrigeration system similar to that described in FIG. 1.

A coil of complex circuitry containing a plurality of refrigerant flow circuits is illustrated in FIGS. 2 through 4. The coil includes two vertically aligned rows of finned tubes, an inner row 40 and outer row 41 which extend back and forth through the heat exchanger. The rows are interconnected by return bends 42 to form a number of individual refrigerant flow circuits of predetermined geometry. Typically, the two terminal ends of each circuit are brought out of the coil assembly through one of the assembly tube sheets as for example tube sheet 45, so that both the entrance and discharge opening to each circuit is conveniently located along one side of the exchanger.

In the complex coil herein described, the coil contains seven flow circuits that are arranged to pass through three heat transfer zones. It should become obvious, however, from the discussion below, that the number of circuits and heat transfer zones may vary depending upon the capacity of the unit involved and other design considerations.

Positioned along the side of the coil adjacent to the tube sheet 45 is a header network adapted to operate in conjunction with two check valves to route the flow of refrigerant through the heat exchanger in a prescribed manner when the exchanger is acting in the system as a condenser and in a different manner when it is acting as an evaporator. The header includes a primary header 47, a dummy or intermediate header 48, a secondary header 49 and a liquid header 46. It should be noted that the primary and secondary headers are axially aligned with the interior chambers of each header being separated by means of a check valve 51. The lower end of primary header 47 is joined in fluid flow communication with a compressor line 50 that is operatively connected to the compressor by means of a four-way valve (not shown).

When the coil is serving as a condenser, high temperature and pressure vapor is delivered into the primary header via line 50 thereby causing check valve 51 to close. The closing of the valve in effect isolates the chamber of header 47 from that of header 49. The now isolated primary header is thus caused to feed refrigerant into four flow circuits by means of feeder tubes 52 operatively associated therewith. The four circuits fed by header 47 are positioned in the lower section of the coil make up a first heat transfer zone, herein referenced zone E.

Figure 5:
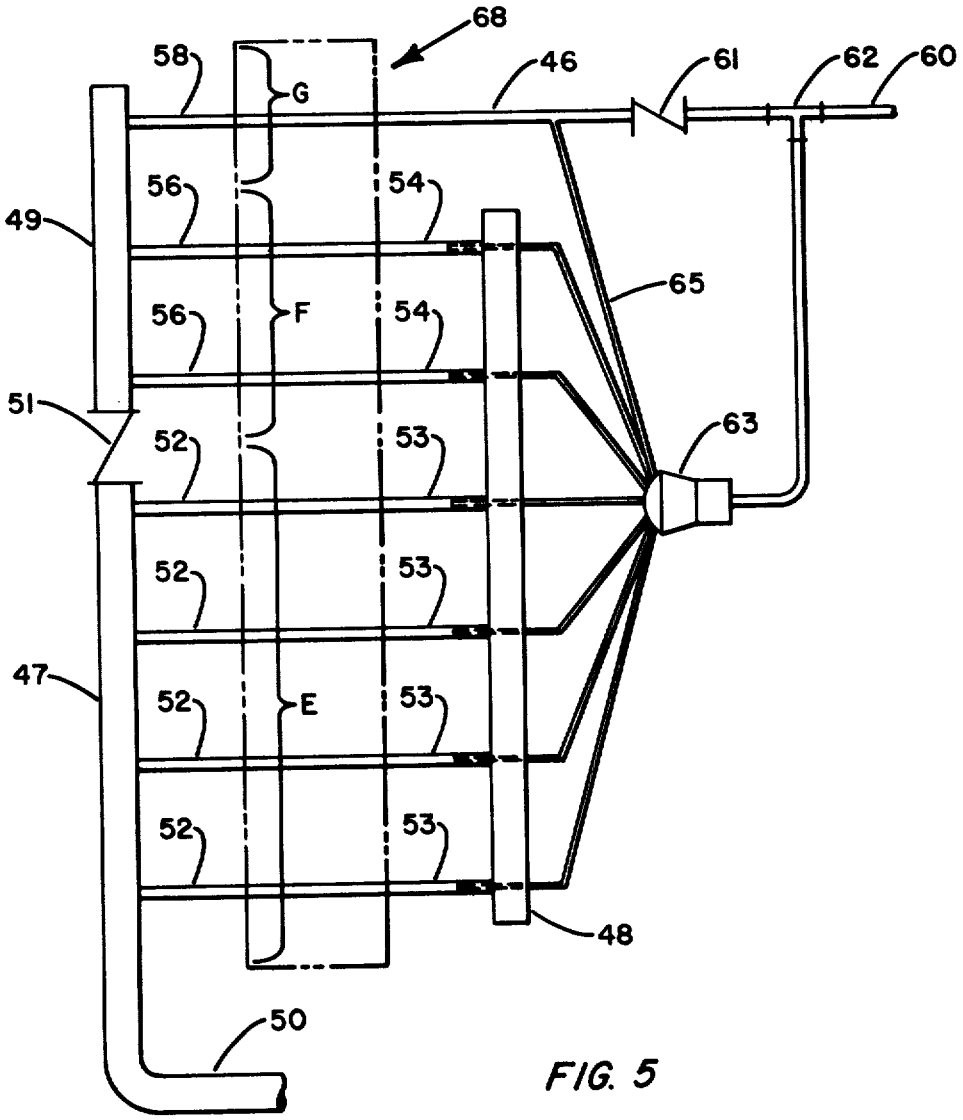
FIG. 5 is a schematic representation illustrating the flow circuits of the exchanger shown in FIGS. 2 through 4.

A simplified schematic illustration of the flow through the heat exchanger is shown FIG. 5. It is believed that the use of the schematic in conjunction with the drawing of FIGS. 2 through 4 will help in better understanding the flow geometry through the exchanger. After passing through the heat flow circuits making up heat transfer zone E, the refrigerant is passed into the dummy header 48 via discharge lines 53. Because of the pressure differential involved, the refrigerant moves upwardly through the dummy header and is discharged into the two uppermost circuits in the coil by means of feeder tubes 54. The two upper refrigerant flow circuits combine to establish a second, smaller heat transfer region F.

After passing through the coil assembly, the refrigerant from the two upper circuits is routed to the secondary header 49 via discharge line 56. The refrigerant is collected in header 49 and fed into the last flow circuit by means of a single feeder tube 58. The last circuit passes through the third and final heat transfer zone, zone G, and is discharged into the liquid header 46.

Preferably, the final heat transfer zone is located in the central portion of the coil to enhance the heat transfer characteristics of the coil. For the purposes of clarity, the final heat transfer zone is illustrated at the top of the heat exchanger assembly.

The refrigerant, which is now in a liquid phase is collected in the liquid header 46 and is passed through opened check valve 61 into a T-connector 62. At the connectors, the refrigerant moves down liquid line 60 toward the indoor coil (not shown).

As can be seen from the description above, the header network, acting in concert with the check valves, operates to direct the refrigerant from the compressor through the heat transfer zones in a series flow progression. Furthermore, the number of flow circuits in each zone diminishes in the direction of flow. By zoning the coil in this manner, the flow geometry of the coil is regulated in response to the increase in density of the fluid to obtain optimum coil performance when operating as a condenser.

When the systems mode of operation is reversed, the coil's function is similarly reversed. In the heating mode, liquid refrigerant is moved along liquid line 60 toward check valve 61. The valve, however, is automatically moved to a closed position because of the change in pressure felt over the valve. The refrigerant is thus forced to move into distributor 63 that is connected to T-connector 62. At the distributor, the flow is separated into seven flow paths by means of capillary tubes 65. It should be noted that the number of capillary tubes are equal in number to the number of flow circuits passing through the coil.

Figure 6:
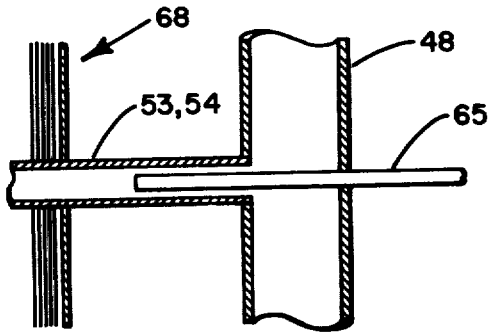
FIG. 6 is an enlarged view in section illustrating a capillary tube feeding one of the flow circuits of the exchanger shown in FIGS. 2 through 4.

As best illustrated in FIG. 6, six of the capillary tubes pass through the dummy header 48 and pass into feeder tubes 54 associated with the four circuits contained in heat transfer zone E and the discharge tubes 53 associated with the two circuits associated with heat transfer zone F. The capillary tubes extend deeply into the various flow circuit tubes to insure that the refrigerant passing through the capillaries is expanded well within each circuit. This in turn, precludes the refrigerant from being passed between circuits by the dummy header. Because the dummy header is at a substantially uniform pressure, the refrigerant is fed evenly into each circuit.

The seventh capillary tube is passed into the liquid header 46 which is at relatively the same pressure as the dummy header. Header 46, in turn, feeds into the circuit associated with heat transfer zone G.

It should be noted that at this time check valve 51, positioned between the primary and secondary headers 47 and 49 is now moved to an open position so that the headers are cojoined to establish a single flow passage leading to the compressor via line 50. As best illustrated in FIG. 5, the seven flow circuits are arranged to empty into the headers 47, 49 when the coil is serving as an evaporator. The circuits associated with zones G and F empty into header 49 via lines 56 and 58 while the four circuits associated with zone E empty into header 47 via lines 52.

Accordingly, when the heat exchanger is called upon to serve as an evaporator in the system, the flow geometry through the coil is automatically changed whereby refrigerant is caused to flow through all the circuits, and thus all the heat transfer zones, simultaneously in a parallel flow arrangement. By maintaining this parallel flow arrangement through the coil, optimum performance of the exchanger can be obtained when utilized as an evaporator.

While this invention has been described with reference to the structure herein disclosed, it is not confined to the specific details as set forth. For example, in place of the capillary tubes wherein employed any expansion device capable of carrying out the flow splitting and throttling process can be similarly employed provided such modifications come within the scope of the following claims.

What is claimed is:

[1. A heat exchanger suitable for use in a heat pump wherein the exchanger acts as a condenser when the flow of refrigerant through the exchanger is in one direction and as an evaporator when the flow of refrigerant through the exchanger is in the opposite direction, the exchanger including one or more refrigerant flow circuits contained within the exchanger, means to separate the circuits into a plurality of heat transfer zones that are arranged so that when air flows through the heat exchanger, the air flows through the heat transfer zones in parallel, and control means operatively associated with the last mentioned means for routing refrigerant in series through the heat transfer zones when the flow of refrigerant through the exchanger is in one direction and to route the refrigerant simultaneously through each of the zones when the flow of refrigerant is in the opposite direction.]

[2. The heat exchanger of claim 1 wherein:

the number of circuits contained in each zone is different, and the control means is arranged to route refrigerant through the zones in a descending order relating to the number of circuits in each zone when the flow of refrigerant through the exchanger is in said one direction.]

[3. The heat exchanger of claim 2 wherein the last zone in the series contains one circuit.]

[4. The heat exchanger of claim 2 wherein the control means is further operable when the flow of refrigerant is in the opposite direction to route refrigerant simultaneously into each of the circuits in each zone.]

[5. The heat exchanger of claim 4 further including an expansion device for expanding refrigerant into each of the circuits when the flow of refrigerant is in said opposite direction.]

6. A heat exchanger for use in a heat pump wherein the exchanger serves as a condenser when the flow of refrigerant to the exchanger is in one direction and as an evaporator when the flow of refrigerant to the exchanger is in the opposite direction, the exchanger including a coil having a plurality of refrigerant flow circuits passing therethrough, a first set of said circuits running between a primary header and an intermediate header, the primary header being connected to a compressor line for delivering refrigerant into the exchanger when the refrigerant flow to the exchanger is in one direction, a second set of said circuits running between said intermediate header and a secondary header, said secondary header being connected to a liquid line for delivering refrigerant to the exchanger when the flow of refrigerant to the exchanger is in the opposite direction and positioned with respect to the first set of said circuits so that when air flows through the heat exchanger the air flow through the first set of said circuits is in parallel with the air flow through the second set of said circuits, a check valve operatively positioned between the primary and secondary headers, the valve being arranged to prevent refrigerant from moving therethrough when the flow of refrigerant to the exchanger is in said one direction whereby the refrigerant is caused to move in series through the first and then the second set of circuits and to pass refrigerant directly from the secondary header into the primary header when the flow is in the opposite direction, an expansion device operatively connected to the liquid line and arranged to expand refrigerant into each of the circuits between the intermediate header and the coil, and a second check valve positioned in the liquid line between the secondary header and the expansion device arranged to operate in opposition to said first check valve to prevent refrigerant from moving into said secondary header from said liquid line when the flow is in the opposite direction whereby the refrigerant moving in the opposite direction is passed simultaneously into each circuit through said expansion device and to permit passage of refrigerant when the flow is in said one direction.

7. The heat exchanger of claim 6 wherein the number of circuits in the first set is greater than in the second set.

8. The heat exchanger of claim 7 further including one additional circuit passing through the coil and being interposed between the secondary header and the liquid line, the additional circuit being operatively connected to the expansion device whereby refrigerant flows in series from the second set of circuits through the additional circuit when the flow is in said one direction and simultaneously through the additional circuit and the other circuits when the flow is in said opposite direction.

9. The heat exchanger of claim 8 wherein the expansion device includes a distributor operatively connected to the liquid line, and a series of capillary tubes running from the distributor to each of the circuits.

[10. A method of routing refrigerant through a heat exchanger arranged to serve as a condenser when the flow of refrigerant to the exchanger is in one direction and as an evaporator is in the opposite direction, the steps including dividing the heat exchanger into a plurality of heat transfer zones arranged so that when air flows through the heat exchanger, the air flows through the zones in parallel paths, directing refrigerant in a series flow progession through each of the heat transfer zones when the flow to the exchanger is in one direction, and rerouting the refrigerant through each of the heat transfer zones simultaneously when the flow to the exchanger is in the opposite direction.]

[11. The method of claim 10 further including the step of expanding the refrigerant simultaneously into each of the circuits when the flow is in the opposite direction.]

[12. The method of claim 10 including the step of arranging the heat transfer zones such that each subsequent zone in the direction of flow in said one direction has less circuits than the previous zone.]

[13. The method of claim 12 wherein the zones are arranged so that the last zone in the series has a single circuit.]

*14. A heat exchanger suitable for use in a heat pump wherein the exchanger acts as a condenser when the flow of refrigerant through the exchanger is in one direction and as an evaporator when the flow of refrigerant through the exchanger is in the op ·site direction, the exchanger including*

*one or more refrigerant flow circuits contained within the exchanger,*

*means to separate the circuits into a plurality of heat transfer zones that are arranged so that when the air flows through the heat exchanger, the air flows through the heat transfer zones in parallel, the number of circuits contained in each zone being different, and*

*control means operatively associated with the last mentioned means for routing refrigerant in series through the heat transfer zones when the flow of refrigerant through the heat exchanger is one direction and to route the refrigerant simultaneously through each of the zones when the flow of refrigerant is in the opposite direction, said refrigerant being routed through the zones in a descending order relating to the number of circuits in each zone when the flow of refrigerant through the exchanger is in said one direction.*

*15. The heat exchanger of claim 14 wherein the last zone in the series contains one circuit.*

*16. The heat exchanger of claim 14 wherein the control means is further operable when the flow of refrigerant is in the opposite direction to route refrigerant simultaneously into each of the circuits in each zone.*

*17. The heat exchanger of claim 16 further including an expansion device for expanding refrigerant into each of the circuits when the flow of refrigerant is in said opposite direction.*

*18. A method of routing refrigerant through the heat exchanger arranged to serve as a condenser when the flow of refrigerant to the exchanger is in one direction and as an evaporator when the flow to the exchanger is in the opposite direction, the steps including*

*dividing the heat exchanger into a plurality of heat transfers zones arranged so that when air flows through the heat exchanger, the air flows through the zones in parallel paths,*

*directing refrigerant in series flow progression through each of the heat transfer zones when the flow to the exchanger is in one direction,*

*rerouting the refrigerant through each of the heat transfer zones simultaneously when the flow to the exchanger is in the opposite direction, and*

*arranging the heat transfer zones such that each subsequent zone in the direction of flow in said one direction has less circuits than the previous zone.*

*19. The method as set forth in claim 18 wherein the zones are arranged so that the last zone in the series has a single circuit.*

* * * * *